United States Patent Office 2,835,710
Patented May 20, 1958

2,835,710

TETROLS CONTAINING AN UNINTERRUPTED EIGHT CARBON CHAIN WITH HYDROXYL GROUPS IN THE 1, 4, 5 AND 8-POSITIONS

Howard E. Holmquist, Wilmington, Del., assignor to E. I. du Pont de Nemours and Company, Wilmington, Del., a corporation of Delaware No Drawing. Application November 25, 1955
Serial No. 549,156

2 Claims. (Cl. 260—635)

This invention relates to a novel chemical process and to new compositions of matter. More particularly this invention relates to a novel catalytic hydrogenation process for converting certain dilactones into tetrols and the novel tetrols obtained thereby.

New unsaturated dilactones are obtained when acetylenes are reacted with carbon monoxide in the presence of a catalytic amount of a cobalt carbonyl. These new unsaturated dilactones and their preparation are the subject matter of the copending patent application of J. C. Sauer, Ser. No. 432,599, filed May 26, 1954, now abandoned, and continuation-in-part patent application thereof Ser. No. 549,155, filed November 25, 1955. These new unsaturated dilactones correspond in composition to $C_8(RR')_2O_4$, wherein R and R' are hydrogen, haloaryl, alkoxyaryl, or hydrocarbon free from non-aromatic unsaturation, and show strong absorption lines in the ultraviolet spectra in the region of 3300–4400 A., and yield suberic acids on hydrogenation over platinum in acetic acid.

In my copending application Ser. No. 488,991, filed February 17, 1955, now abandoned, of which Ser. No. 579,459 is a continuation-in-part, there is disclosed and claimed the process of hydrogenating over a copper chromite catalyst the unsaturated dilactones of the aforesaid Sauer application Ser. No. 432,599, now abandoned, and said continuation-in-part application Ser. No. 549,155, to obtain octamethylene glycols.

It is an object of this invention to provide a new chemical process and novel compositions of matter. A further object is to provide a novel catalytic hydrogenation process for converting certain dilactones into new tetrols. A still further object is to provide new tetrols. Another object is to convert the unsaturated dilactones obtained from abundantly available and relatively inexpensive carbon monoxide and acetylenes in two steps to new tetrols. Other objects will appear hereinafter.

These and other objects of this invention are obtained by the following process for preparing tetrols which comprises hydrogenating, at a temperature above 200° C. under a hydrogen pressure in excess of 1000 lb./sq. in. and in contact with a copper chromite catalyst, the hexahydrolactone of an unsaturated dilactone having the formula $C_8(RR')_2O_4$ wherein R and R' are hydrogen, haloaryl, alkoxyaryl or hydrocarbon radicals free from non-aromatic unsaturation.

This invention also provides new tetrols containing an uninterrupted eight carbon chain with the hydroxyl groups attached to carbon atoms in positions 1, 4, 5 and 8 of said carbon chain. These tetrols contain an uninterrupted eight carbon chain with two terminal primary hydroxyl groups attached to carbon atoms in positions 1 and 8 and two secondary vicinal hydroxyl groups attached to carbon atoms in positions 4 and 5 of said carbon chain.

This invention particularly provides the new tetrol 1,4,5,8-octanetetrol and a novel method for its preparation which comprises hydrogenating, at a temperature above 200° C. under a hydrogen pressure in excess of 1000 lb./sq. in. and in contact with a copper chromite catalyst, the hexahydrodilactone, tetrahydro-[2,2'-bifuran]-5,5'(2H,2'H)-dione. This hexahydrodilactone is prepared by hydrogenating the unsaturated dilactone $[\Delta^{2,2'(5H,5'H)}$-bifuran]-5,5'-dione in contact with a palladium, nickel, or ruthenium catalyst.

In a convenient way for preparing the tetrols of this invention starting with the unsaturated dilactone, a pressure reactor is charged with the unsaturated dilactone, a reaction medium, and at least 1% by weight of the dilactone of an active palladium catalyst. The reactor is swept with oxygen-free nitrogen, placed on an agitating rack and hydrogen is injected. After hydrogen absorption has ceased, the reactor is permitted to cool, opened, and the contents discharged and filtered.

The hydrogenated product, obtained as above, the hexahydrolactone, is placed in a pressure reactor and a copper chromite catalyst is then added in amount which is at least 5% by weight of the hydrogenated dilactone. The charged reactor is swept with oxygen-free nitrogen, placed on an agitating rack, hydrogen is injected, and the charge agitated and heated to between 200 and 300° C. The pressure within the reactor is then adjusted to above 1000 lb./sq. in. After reaction is complete, as evidenced by cessation of pressure drop, the reactor is permitted to cool, opened, discharged, and the contents filtered. The desired tetrol having an eight carbon chain is crystallized from the residue after removal of the solvent by distillation under reduced pressure.

The invention is illustrated in a specific preferred embodiment as follows:

EXAMPLE

*Preparation of 1,4,5,8-octanetetrol from tetrahydro-[2,2'-bifuran]-5,5'(2H,2'H)-dione*

A solution of 4.36 g. of tetrahydro-[2,2'-bifuran]-5,5'(2H,2'H)-dione ($C_8H_{10}O_4$), M. P. 104–106° C., prepared as described subsequently, in 200 ml. of dioxane was shaken with 1 g. of copper barium chromite and hydrogen (3000 lb./sq. in.) at 225° C. for three hours. The filtered product was concentrated under reduced pressure leaving a residue (4.0 g.) from which 1.35 g. of 1,4,5,8-octanetetrol crystallized. After recrystallization from ethyl acetate-petroleum ether, it melted at 111.5° C.

*Analysis.*—Calc'd for $C_8H_{18}O_4$: C, 53.91; H, 10.18; M. W., 178. Found: C, 53.41, 53.53; H, 10.18, 10.38; M. W., 159, 156.

The tetrol was converted by acetic anhydride to a tetraacetate, M. P. 50–51° C.

*Analysis.*—Calc'd for $C_{16}H_{26}O_9$: C, 55.48; H, 7.57; M. W., 346. Found: C, 55.64; H, 7.61; M. W., 368, 364.

The tetrahydro-[2,2'-bifuran]-5,5'(2H,2'H)-dione, used in the above experiment, was prepared by hydrogenating the unsaturated dilactone $[\Delta^{2,2'(5H,5'H)}$-bifuran]-5,5'-dione, disclosed and claimed in the aforesaid copending patent applications of J. C. Sauer, over a palladium catalyst, as illustrated in Examples A to C, below:

EXAMPLE A

A solution of 2.15 g. of $[\Delta^{2,2'(5H,5'H)}$-bifuran]-5,5'-dione ($C_8H_4O_4$), prepared as described subsequently, in 200 ml. of dioxane was shaken with 1.2 g. of a palladium catalyst (1% on calcium carbonate) and hydrogen at 45 lb./sq. in. for 106 minutes. The product was distilled to give 1.5 g. of a liquid-solid mixture boiling at 178–184° C. (2 mm.). The solid portion was recrystallized from chloroform-petroleum ether to give white needles, M. P. 104° C., the saturated dilactone, tetrahydro-[2,2'-bifuran]-5,5'-(2H,2'H-dione).

*Analysis.*—Calc'd for $C_8H_{10}O_4$: C, 56.56; H, 5.92. Found: C, 56.66; H, 6.02.

EXAMPLE B

In two runs, 16.6 g. and 44.1 g. of the unsaturated dilactone of Example A was slurried in 350 ml. of acetic acid to which 1 g. and 2 g., respectively, of a 10% palladium-on-carbon catalyst was added. Hydrogen was added to a pressure of 45 lb./sq. in., and the slurries were shaken for five hours. The systems were repressured to 45 lb./sq. in. three times. The absorption of hydrogen was virtually complete after three hours in each run. The clear solutions were filtered and combined. After removal of the solvent by distillation under reduced pressure, the saturated dilactone was distilled to give a principal fraction at 175–177° C. (0.7 mm.) weighing 50.1 g. Part of the distillate crystallized to give a white solid, the saturated dilactone of Example A, M. P. 106° C. after recrystallization from ethyl alcohol. The uncrystallized portion of the distillate was shown to have infrared absorption characteristics similar to that of the crystalline product.

EXAMPLE C

A solution of the unsaturated dilactone of Example A (22.4 g., 1.37 mole) in ethyl acetate (200 ml.) was hydrogenated at 100° C. and 2500 lb./sq. in. for 3½ hours over 5 g. of palladium catalyst (1% on calcium carbonate). The pressure drop was 600 lbs. The filtered solution was concentrated to give a syrup (21.0 g., 90%) from which 3.2 g. of the saturated hexahydrodilactone of Examples A and B, M. P. 106° C., was crystallized by chilling. The remainder of the product was distilled at 180° C. (1 mm.). Careful refractionation gave two colorless cuts at 174° C. and 175° C. (0.8 mm.), whose composition and infrared spectra were the same as those of the crystalline saturated dilactone.

In place of palladium there can be used alloy skeleton nickel as shown below.

EXAMPLE D

A solution of 3.0 g. of the unsaturated dilactone of Example A in 70 ml. of ethyl acetate was shaken with 0.3 g. of alloy skeleton nickel catalyst and hydrogen at 875 atmospheres for 16 hours at 80–86° C. The filtered product was distilled at 180° C. (2 mm.) to give a liquid-solid mixture. The solid saturated dilactone melted at 102–103° C.

The unsaturated dilactone, [Δ$^{2,2'(5H,5'H)}$-bifuran]-5,5'-dione, used in Examples A to D was prepared by charging into a steel pressure reactor 26 g. of acetylene, 200 ml. of acetone, and 1.5 g. of dicobalt octacarbonyl. The mixture was heated with carbon monoxide at a pressure of 1000 atmospheres for 14 to 17 hours. The product was filtered and the brown solid was extracted with ethyl acetate for 24 hours. The extract was permitted to crystallize and the crystalline material was separated, and dried at room temperature. There was obtained 20 g. of the unsaturated dilactone, $C_8H_4O_4$, M. P. 229° C. after several recrystallizations from acetic acid.

This dilactone [Δ$^{2,2'(5H,5'H)}$-bifuran]-5,5'-dione exists in the form of two structural isomers, which yield suberic acid when hydrogenated with platinum in acetic acid. The normal or low melting form, 230–237° C., is the trans form and the high melting form 240–248° C., is the cis form. The formulae of these structural isomers of [Δ$^{2,2'(5H,5'H)}$-bifuran]-5,5'-dione are as follows:

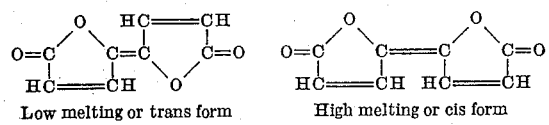

Low melting or trans form     High melting or cis form

Although the examples have illustrated batch operation, it is to be understood that the process disclosed herein can be carried out as a continuous or semi-continuous up-flow, down-flow, co-current, or counter-current vapor or liquid phase operation, with recovery of unconverted reactants for recycling.

The new tetrols of this invention are the products obtained by hydrogenating in the presence of a copper chromite catalyst a hexahydrodilactone of an unsaturated dilactone having the formula $C_8(RR')_2O_4$ wherein R and R' are hydrogen, haloaryl, alkoxyaryl, or monovalent hydrocarbon radicals free from non-aromatic unsaturation, such as alkyl, aryl, and cycloalkyl. These unsaturated dilactones show strong absorption lines in the ultraviolet spectra in the region of 3300 to 4400Å and yield suberic acids on hydrogenation with platinum in acetic acid. These unsaturated dilactones can be position isomers, corresponding to the cis and trans forms of

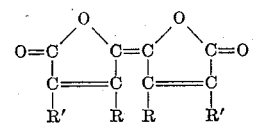

the cis and trans forms of

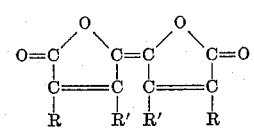

and the cis and trans forms of

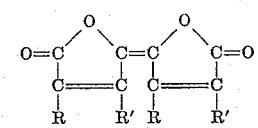

wherein the R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals free from non-aromatic unsaturation, especially of not more than 12 carbon atoms, e. g., alkyl especially short chain alkyl, i. e., containing less than 7 carbon atoms, aryl, especially where the aryl radical is hydrocarbon of not more than 10 carbon atoms, aralkyl, especially of not more than 7 carbons, or cycloalkyl, particularly of not more than 7 carbon atoms. Examples of such radicals are methyl, ethyl, octyl, decyl, dodecyl, phenyl, tolyl, xylyl, benzyl, cyclohexyl, naphthyl, methylcyclohexyl, methoxyphenyl, ethoxyphenyl, decyloxyphenyl, dodecyloxyphenyl, dodecyloxynaphthyl, chlorophenyl, and the like.

These dilactones are obtained by reacting an acetylene with carbon monoxide in an inert organic solvent in the presence of a cobalt carbonyl catalyst.

In one method of operation, a pressure reactor is charged with an inert organic solvent and a catalytic amount of a cobalt carbonyl catalyst, the reactor is closed, cooled to 0° C., or lower, and evacuated. A predetermined amount of acetylene is then admitted from a storage vessel calibrated so that the amount of acetylene delivered is measured by the drop in pressure, and the reactor is placed in a shaking device. Carbon monoxide is introduced to between 50 and 3000 atmospheres and the charge heated and agitated at 80 to 175° C. These conditions are maintained until there is no further reaction, as evidenced by cessation of pressure drop. Throughout the reaction period the pressure within the reactor is maintained within the desired limits by periodic injections of carbon monoxide.

After reaction is complete the reactor is permitted to cool, unreacted acetylene and carbon monoxide are vented to the atmosphere, and the reaction mixture slurried with an inert organic solvent. The slurry is filtered and the residue on the filter extracted with a hot inert organic solvent. The extract is cooled and the crystalline product which separates is filtered and dried.

The acetylenes used in preparing these dilactones correspond to R—C≡C—R', wherein R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals which are free from non-aromatic unsaturation, especially of not more than 12 carbon atoms, e. g., alkyl, especially short chain alkyl, i. e., containing less than seven carbon atoms, aryl, especially where the aryl radical is hydrocarbon of not more than 10 carbon atoms, aralkyl, especially of not more than seven carbons, or cycloalkyl, particularly of not more than seven carbon atoms. Examples of such radicals are methyl, ethyl, octyl, decyl, dodecyl, phenyl, tolyl, xylyl, naphthyl, benzyl, cyclohexyl, methylcyclohexyl chlorophenyl, chloronaphthyl, methoxyphenyl, ethoxyphenyl, decyloxyphenyl, dodecyloxyphenyl, dodecyloxynaphthyl, and the like. Examples of such acetylenes are acetylene, methyl acetylene, 2-decyne, phenylacetylene, naphthylacetylene, p-chlorophenylacetylene, p-ethoxyphenylacetylene, p-decyloxyphenylacetylene, benzylacetylene, cyclohexylacetylene, methylcyclohexylacetylene, etc.

By employing such substituted acetylenes in preparing the dilactones $C_8(RR')_2O_4$, the radicals R and R' will correspond to the substitutents attached to the triply bonded carbon atoms in the acetylene reactant, i. e., R and R' in R—C≡C—R'. Thus, as shown by said Sauer continuation-in-part application, Serial No. 549,155, filed November 25, 1955, there are prepared the dilactones:

[$\Delta^{2,2'(5H,5'H)}$]-bi(phenylfuran)]-5,5'-dione,
[$\Delta^{2,2'(5H,5'H)}$]-bi(diethylfuran)]-5,5'-dione,
[$\Delta^{2,2'(5H,5'H)}$]-bi(n-butylfuran)]-5,5'-dione,
[$\Delta^{2,2'(5H,5'H)}$]-bi($\beta$-naphthylfuran)]-5,5'-dione,
[$\Delta^{2,2'(5H,5'H)}$]-bi(chlorophenylfuran)]-5,5'-dione,
[$\Delta^{2,2'(5H,5'H)}$]-bi(o-methoxyphenylfuran)]-5,5'-dione and the like.

The reaction between the acetylene and carbon monoxide is carried out batchwise or continuously in the presence of an inert organic liquid medium. By "inert organic liquid medium," as used herein, is meant organic liquids which contain no active hydrogen, as determined by the Zerewitinoff method [Ber. 40, 2026 (1927); J. Am. Chem. Soc. 49, 3181 (1927)]. Thus, the acetylene is the only compound in the reaction system which may contain active hydrogen. Specific inert organic liquids are isooctane, toluene, acetonitrile, acetone, ethyl acetate, dioxane, diethyl ether, xylene, benzene, etc. The nitriles and ketones are in general preferred over the hydrocarbons and ethers.

In the formation of the dilactones, there are actually involved 2 moles of an acetylene and 4 moles of carbon monoxide. In practice, this ratio is attained by charging a weighed sample of the acetylene into the reactor and then injecting carbon monoxide in amount sufficient to provide 2 moles thereof per mole of acetylene. Employing a 400 ml. reactor and 25-30 g. of acetylene, the amount of carbon monoxide injected is that which will provide a total pressure in the range of 50-3000 atmospheres at reaction temperature.

The reaction is conducted until there is no further pressure drop and this generally requires from 10-20 hours, although shorter or longer reaction times can be employed. Throughout the reaction period the pressure within the reactor is maintained by periodic injections of carbon monoxide.

The hexahydrodilactones employed in the process of this invention are obtained by reducing the aforesaid unsaturated dilactones over a nickel, palladium or ruthenium catalyst. The reduction of the unsaturated dilactone to the hexahydrodilactone is preferably realized with palladium at temperatures of 20 to 150° C. and pressures of 10 to 2000 lb./sq. in. although higher pressures as shown by Examples C and D can be used. However, instead of palladium there may be used active nickel or ruthenium catalysts. The amount of catalyst used ranges from 1 to 20% by weight of the unsaturated dilactone.

Any palladium catalyst may be used. Thus, there may be used palladium or any of its compounds such as the oxide, chloride, nitrate, etc., and the catalyst may be unsupported or supported on inert base materials. Compounds of palladium appear to be more or less completely reduced to palladium metal during use. Suitable supports are charcoal, alumina, calcium carbonate, pumice, silica, etc. The particle size of the support may vary from 40 to 300 mesh for use in fluidized systems, whereas for use in fixed bed systems supports of larger particle size, e. g., 4 to 40 mesh are satisfactory.

A suitable palladium catalyst is prepared by depositing palladium chloride on granular activated coconut charcoal, in amount sufficient to give a concentration of 0.2 to 20 g. of palladium per liter of catalyst. Preferably the charcoal is subjected to pre-treatment with an acid such as nitric acid prior to contacting it with the palladium compound. A typical preparation is the following:

A solution of 8.33 g. of palladium chloride in 5.5 ml. of concentrated hydrochloric acid and 40 ml. of water is prepared by heating the mixture on a steam bath. The resulting solution is poured into a solution of 135 g. of sodium acetate trihydrate in 500 ml. of water contained in a one-liter reduction bottle. Forty-five grams of activated coconut charcoal is added and the mixture is hydrogenated until hydrogen absorption ceases, which is between 1 and 2 hours. The catalyst is collected on a suction filter and washed with 2 liters of water in five portions. The filter cake, after removal of most of the water, is dried in air and stored in a desiccator over calcium chloride. The catalyst, which weighs from 40 to 50 g. and contains about 10% palladium, is stored, after being powdered, in a tightly closed container.

Ruthenium as the free metal or as its oxide or salt can be used. The ruthenium catalyst can be supported or unsupported on a carrier such as charcoal, silica gel, alumina, etc. A suitable method for preparing a charcoal-supported ruthenium catalyst consists in fusing ruthenium or its oxide with sodium peroxide, dissolving the salt, pouring the resulting solution over charcoal and drying the impregnated charcoal. Other methods, however, can be used, e. g., that of U. S. Patent 2,074,404 or other procedures based on the reduction of a compound of ruthenium in the presence of a carrier substance.

Nickel in the form of the stabilized or the pyrophoric metal, or as the oxide or salt can be used in place of palladium. Elementary nickel in pyrophoric or stabilized state can be prepared by methods yielding the active form of the metal at temperatures below 150° C., or by reducing a salt, oxide, or hydroxide of the metal with hydrogen at temperatures in the range of 400 to 700° C. The pyrophoric metal may be stabilized by exposure to an oxidizing atmosphere under conditions such that the temperature of the catalyst is maintained below 50° C.

Pyrophoric nickel may be conveniently made by extracting with alkali the alkali-soluble component of an alloy of nickel with an alkali-soluble metal or by reducing a nickel salt with sodium naphthalene as described in U. S. Patent 2,177,412. The nickel catalyst may be unsupported or supported. The extender may be added during the catalyst preparation or it may be formed in situ. The example which follows illustrates preparation of a typical elementary nickel catalyt.

Three hundred parts of a finely divided alloy composed of equal parts of nickel and aluminum is added with stirring over a period of one and one-half hours to a solution of 342 parts of sodium hydroxide in 1590 parts of distilled water maintained at 50° C. The supernatant liquid is then decanted off and the catalyst washed with distilled water until it is free from alkali.

The product is pyrophoric and it may be stabilized as follows:

The aqueous sludge of the product is placed in a rotating vessel. The vessel is sealed, the air is exhausted by means of a vacuum pump, and the mass heated under vacuum until all the free water is removed. The vessel is then cooled continuously with cold water and a small amount of air is blown through the dry mass at such a rate that the temperature of the dry mass does not exceed 50° C. After 2 hours a sample of the dry product is no longer pyrophoric. The catalyst is found by analysis to consist of 37% nickel, of which 55% is in the elementary state, and 43% $Al_2O_3$. The catalyst therefore probably consists of partially oxidized nickel supported on alumina.

The product obtained by reducing either the cis- or trans-isomer of

[$\Delta^{2,2'(5H,5'H)}$-bifuran]-5,5'-dione ($C_8H_4O_4$), is tetrahydro-[2,2'-bifuran]-5,5'-(2H,2'H)-dione ($C_8H_{10}O_4$). An alternative way for preparing this hexahydrodilactone is by treating a butadiene/styrene copolymer with sulfuric acid and hydrogen peroxide, as disclosed by Handa, Chem. of High Polymers of Japan 6, 382 (1949).

The hydrogenation of the hexahydrodilactone is a ring cleaving reaction and is effected with copper chromite at temperatures of 200 to 300° C. and pressures of 1000 to 10,000 lb./sq. in.

Suitable copper chromite containing catalysts are those obtained by heating a double chromate of copper and a nitrogen base to its spontaneous decomposition temperature, as described in U. S. Patents 1,746,783, 1,964,001, 2,066,153 and 2,137,407. Especially good results are obtained with a copper chromite promoted with barium chromite, prepared as described in Example III in U. S. Patent 2,040,944.

The amount of catalyst is at least 5% of the hexahydrodilactone being hydrogenated. Since the rate of hydrogenation is improved by increasing the catalyst concentration, usually an amount is employed which is at least 10% and preferably at least 20% by weight of the hexahydrodilactone.

The steps of producing the hexahydrodilactone and its hydrogenation to the tetrol are carried out in the presence of a reaction medium to provide better contact between catalyst and reactants and to dissipate the heat of reaction. Suitable liquid reaction media are dioxane, cyclohexane, diethyl ether, ethanol, and the like.

The tetrols of this invention contain an uninterrupted eight carbon chain with the hydroxyl groups attached to the carbon atoms in the positions 1, 4, 5, and 8. That is they contain two terminal primary hydroxyls attached to the carbon atoms in positions 1 and 8 and two secondary vicinal hydroxyls attached to the carbon atoms in positions 4 and 5.

When tetrahydro - [2,2'-bifuran]-5,5'(2H,2'H)-dione is employed there is obtained 1,4,5,8-octanetetrol having the formula

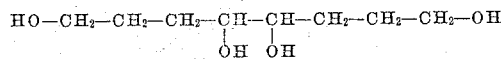

The tetrahydro-[2,2'-bifuran]-5,5'(2H,2'H)-dione has the structural formula

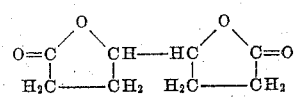

Unsaturated dilactones conforming to the general formula $C_8(RR')_2O_4$, wherein the R's are monovalent saturated hydrocarbon radicals, especially of not more than 12 carbon atoms, e. g., alkyl, especially short chain alkyl, i. e., containing less than 7 carbon atoms or cycloalkyl, particularly of not more than 7 carbon atoms, such as methyl, ethyl, octyl, decyl, dodecyl, cyclohexyl, methylcyclohexyl, and the like, yield tetrols of the general formula:

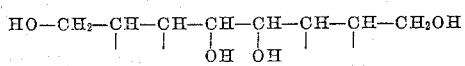

wherein one of the carbon atoms in each of the 2,3 and 6,7 positions is attached to R and the other carbon atoms in each of said positions is attached to R', said R and R' being defined as aforesaid. The hexahydrodilactones from which these tetrols are prepared have the formula

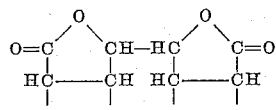

wherein one free valence of each ring is satisfied by R and the other free valences of said rings are satisfied by R', said R and R' being defined as aforesaid.

The process of this invention makes these new tetrols accessible in three steps from cheap, abundantly available acetylenes and carbon monoxide. The process is versatile in that by proper selection of the acetylene it is possible to prepare substituted octanetetrols without having to alter process conditions. Thus, the process not only makes 1,4,5,8-octanetetrol readily available at a potentially low cost, but also makes available substituted octanetetrols.

The octanetetrols prepared in accord with this invention are oxidized with lead tetraacetate or hydrogen periodate to butyrolactones, which are valuable intermediates for plasticizers, substitutes for citric acid, and for the synthesis of α-pyrrolidones for conversion to synthetic blood plasma. These octanetetrols are also useful for conversion to film-forming polyesters by reaction with carboxylic acids, such as phthalic, terephthalic acids, etc.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A tetrol containing an uninterrupted eight carbon chain represented by the formula

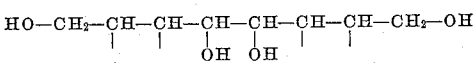

wherein the free valences of one of the carbon atoms in each of the 2,3 and 6,7 positions is satisfied by R and the free valences of the other of the carbon atoms in each of said positions is satisfied by R', said R and R' being selected from the class consisting of hydrogen, alkoxyaryl wherein the alkoxy radical is of not more than 12 carbon atoms and the aryl radical is hydrocarbon of not more than 10 carbon atoms, haloaryl wherein the aryl radical is hydrocarbon of not more than 10 carbon atoms, and monovalent hydrocarbon radicals free from non-aromatic unsaturation of not more than 12 carbon atoms.

2. 1,4,5,8-octanetetrol represented by the formula

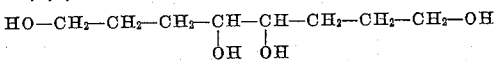

(References on following page)

References Cited in the file of this patent

UNITED STATES PATENTS

| | | |
|---|---|---|
| 2,097,493 | Leuck et al. | Nov. 2, 1937 |
| 2,285,448 | Loder | June 9, 1942 |
| 2,440,929 | Bremner | May 4, 1948 |
| 2,473,406 | Zellner et al. | June 14, 1949 |
| 2,657,220 | Alexander et al. | Oct. 27, 1953 |
| 2,704,771 | Smith | Mar. 22, 1955 |

OTHER REFERENCES

Beilstein: "Handbuch der Organ. Chem.," vol. I (1918), p. 530.

Conner et al.: Jour. Amer. Chem. Soc., vol. 54, pp. 4678–90 (1932) (13 pp.)

Conner et al.: J. A. C. S., vol. 54 (1932), pp. 1138–45.

Wolfrom et al.: Jour. Amer. Chem. Soc., vol. 68 pp. 1443–8 (1946), 6 pp.

Adams et al.: Jour. Amer. Chem. Soc., vol. 72, pp. 158–163 (1950), 6 pp.

Folkers et al.: (Ibid.), pp. 1145–54.

Christian et al.: (Ibid.), vol. 69, p. 1961.